United States Patent Office 3,312,651
Patented Apr. 4, 1967

3,312,651
LOW BAKED FILMS RESULTING FROM SPRAYABLE MIXTURES
Pascal B. Daniels, Trumbull, and James V. Morgia, Stratford, Conn., assignors to United Aircraft Corporation, East Hartford, Conn., a corporation of Delaware
No Drawing. Filed July 17, 1963, Ser. No. 295,797
9 Claims. (Cl. 260—29.6)

This invention relates to a coating composition in the form of a sprayable mixture of an epoxyphenolic resin and finely divided polyhalocarbon particles suspended in a dispersing medium which includes a lower alkyl acetate ester as a thinner. The sprayable composition of this invention has good build-up properties due to the presence of high amounts of solids, i.e., non-volatile components, whereby the composition requires less application time than heretofore required in the formation of a solid, durable film of comparable thickness. The sprayable compositions of this invention are particularly suitable for the production of electrical insulating films which, of course, are of a relatively high thickness. In addition, the film resulting from application of the sprayable composition of this invention on a suitable substrate exhibits good lubricating and load-bearing properties, as well as affording protection against corrosion.

The use of epoxyphenolic resins and polyhalocarbon resins in coating composition for the production of films having good anti-corrosion and lubricating properties is well known. For example, U.S. Patent 2,976,257 to Dawe et al. discloses dispersion of polytetrafluoroethylene which is suitable for the formation of dry film lubricant coatings on a variety of substrate surfaces. The coating compositions of the aforementioned Dawe et al. patent, in addition to polytetrafluoroethylene resin, contain a thermosetting resin. Among the many thermosetting resins that may be used are epoxyphenolic resins.

In th prior art sprayable coating compositions of the above mentioned type, it has been necessary to limit the total solids of the polytetrafluoroethylene and thermosetting resin to 25% by weight of the total dispersion, in order to prevent flocculation of the polytetrafluoroethylene particles. As mentioned hereinbefore, the term "solids" as used herein refers to the total non-volatile components and hence includes the solid polytetrafluoroethylene dispersed particles, as well as the thermosetting resin. The thermosetting resin may be in liquid form in the sprayable mixture but, since it is nonvolatile, it becomes a solid component of the dried film. Because of the relatively low solids content of the aforedescribed prior compositions, exemplified in the Dawe et al. patent, such compositions do not possess high build-up properties and thus require a relatively long application time. Also, such compositions are not particularly suitable for forming films of relatively large thickness such as that required for effecting good insulation.

Objects and advantages of the invention will be set forth hereinafter and in part will be obvious herefrom, or may be learned by practice with the invention, the same being realized and attained by means of the compositions, steps and methods pointed out in the appended claims.

The invention consists in the novel compositions, steps and methods herein shown and described.

It is an object of this invention to provide a novel sprayable mixture having good build-up properties whereby only a relatively short application time is required in the formation of films of sufficient thickness to provide good insulating effects. Another object of this invention is to provide solid, durable films having good insulating, lubricating and load-bearing properties, as well as affording good protection against corrosion. A still further object of this invention is to provide a novel sprayable mixture that, on application to a substrate, forms a low bake coating having a highly desirable combination of properties.

It has been found that the objects of this invention may be realized by forming a sprayable mixture comprising an epoxyphenolic resin, normally in the form of an organic solvent solution; finely divided polyhalocarbon particles, normally in the form of an aqueous dispersion; and, a lower alkyl acetate ester, which is a component of the dispersing medium and serves as a thinner; the ratio of solids of epoxyphenolic resin to polyhalocarbon particles being in the range of 2.0 to 5.0 parts by weight of epoxyphenolic resin per part of polyhalocarbon particles, the total solids content of the sprayable mixture being in the range of 28.4 to 38.2% by weight of the total composition. Quite surprisingly, it has been found that the utilization of a lower alkyl acetate ester as a thinner, preferably ethyl acetate, permits the formation of stable sprayable mixtures of high solids content with no or very little flocculation of the suspended polyhalocarbon particles so that the particles remain in suspension.

Epoxyphenolic resins are well known resins and are formed by modifying epoxy resins with phenols, the epoxy resins broadly including the condensation products of the reaction of epichlorohydrin and bisphenols or bifunctional hydroxyl-containing compounds. In forming the sprayable mixture of this invention, the epoxyphenolic resin is generally in the form of an organic solvent solution, a typical solvent being a mixture of equal parts of alcohol and methyl isobutyl ketone. Typical commercial epoxyphenolic compositions that may be used in accordance with this invention are a 38% by weight solution in an organic solvent of a phenol modified epoxy resin available commercially under the trade name "Midland V 665 Epoxy Phenolic Resin," and a 35% by weight solution in an organic solvent of an epoxy modified phenolformaldehyde resin available commercially under the trade name "Enterprise 7927 D." The solvent used in the aforementioned "Midland V 665 Epoxy Phenolic Resin" is a mixture of

| | Percent |
|---|---|
| Methyl isobutyl ketone | 23 |
| Diacetone alcohol | 26 |
| Alcohols | 10 |
| Cellosolve acetate | 19 |
| Aromatic hydrocarbons | 22 |

The solvent of "Enterprise 7927 D" is a mixture of methyl isobutyl ketone, butanol, and xylol as shown in Table 1 Example 10 of the hereinbefore mentioned U.S. Patent No. 2,976,257 to Dawe et al.

For convenience sake, in referring to the polyhalocarbon particles hereinafter, reference will be made to the preferred polytetrafluoroethylene particles. It should be realized, however, that other equivalent dispersible polyhalocarbon particles, e.g., trifluorochloroethylene, may be used instead of polytetrafluoroethylene particles in accordance with the principles of this invention.

The polytetrafluoroethylene particles used herein are those which have been condensed or pluralized to an extent such that they are normally solid and are dispersible in water and have a particle size of about 0.1 to about 3 microns, the predominant portion having a size of about 1 micron. It is preferred to use an aqueous dispersion of colloidal polytetrafluoroethylene particles. Suitable starting material for this purpose is an aqueous suspension containing 60% polytetrafluoroethylene particles, of a size in the range of about 0.1 to about 3 microns, in water, and which is available under the trade name "Teflon-30." Another example of a suitable polytetrafluoroethylene composition is Teflon Resin 851-204 made by the E. I. du Pont de Nemours & Co. (Inc.), which is a 48% by weight aqueous dispersion of polytetrafluoroethylene particles of a size in the range of .192–.200 micron.

The sprayable mixtures of this invention may be formed by mixing 6 to 7 parts by volume of a solvent solution of epoxyphenolic resin (38% by weight solids content) with 0.5 to 1.0 parts by volume of an aqueous dispersion of finely divided polytetrafluoroethylene particles (48% by weight solids content), and adding to the resultant mixture 2 to 3 parts by volume ethyl acetate. Of course, where the solids content of the solution of epoxyphenolic resin and the aqueous dispersion of polytetrafluoroethylene are different than the aforementioned compositions, the relative volumes of such compositions are adjusted to give a solids content ratio equivalent to those of the aforedescribed compositions.

In forming the sprayable mixtures of this invention, the aqueous dispersion of finely divided polytetrafluoroethylene particles, in an appropriate amount, are mixed slowly with an appropriate amount of the organic solvent solution of epoxyphenolic resin with constant stirring. The stirring is continued until the polytetrafluoroethylene particles are uniformly dispersed throughout the resulting mixture. A lower alkyl acetate, preferably ethyl acetate, in an appropriate amount, is added as a thinner and the mixture is stirred until a uniform mixture is obtained. The resulting sprayable mixture may then be sprayed on a surface in a suitable manner and the resulting sprayed composition dried to form a low bake coating that provides a combination of good insulating qualities, toughness, durability and lubricity.

As indicated hereinbefore, the ratio of solids of epoxyphenolic resin to polytetrafluoroethylene particles is in the range of 2.0 to 5.0 parts by weight of epoxyphenolic resin per part of polytetrafluoroethylene particles. When the ratio of epoxyphenolic resin to polytetrafluoroethylene particles is greater than the above indicated maximum amount, a lesser lubricating type coating is produced. When the ratio of epoxyphenolic resin to polytetrafluoroethylene particles is in an amount less than the above indicated minimum ratio, the Teflon particles tend to coalesce and partially settle out.

As indicated heretofore, preferred sprayable mixtures are those employing ethyl acetate as a thinner. Also useful for this purpose are butyl acetate and amyl acetate. The acetate thinner is in an amount from 27 to 40% by weight, and preferably 27 to 32% by weight, of the sprayable mixture. When the acetate thinner is in an amount greater than the above indicated maximum amount, the Teflon particles tend to coalesce and partially settle out. On the other hand, when the acetate thinner is in an amount less than the above indicated minimum amount, it becomes more difficult to obtain uniform sprayed films.

The total solids content, i.e., the total amount of nonvolatile epoxyphenolic resin and polytetrafluoroethylene particles, is generally in an amount 28.4 to 32.2% by weight of the total sprayable composition, and preferably 30 to 32% by weight. If the total solids content is greater than the above indicated maximum amount, it is difficult to obtain a uniform sprayed film. On the other hand, if the total solids content is less than the above indicated minimum amount, more time and spray passes are required to build up the desired film thickness.

The sprayable mixtures may be applied to the desired substrate by any suitable spraying technique. Examples of suitable substrate to which the compositions of this invention may be applied are metal, wood, glass, rubber, etc. Of course, instead of spraying the coating compositions of this invention other less desirable techniques may be used for applying the desired coating, e.g., brushing. After the coating has been applied to the desired substrate it is air-dried and then baked at a relatively low temperature. A suitable time for air-drying is generally 60 to 240 minutes, e.g., 60 minutes. A suitable temperature for baking is generally in the range of 310 to 400° F. for 60 to 120 minutes, e.g., baking at 325° F. for 1 hour. Of course, the time required for baking varies inversely with the temperature.

Because of the good build-up properties of the coating composition of this invention, it is possible to form coating of thicknesses as high as 3 mil in a short application time, which makes the present invention particularly suitable for producing good insulating films in a short period of time. Of course, for many applications, coatings of a lesser thickness than 3 mil are desired, e.g., 0.5 to 2 mil.

In order to illustrate the principles of this invention more specifically, the following example is given which describes in detail a method of producing the sprayable mixtures of this invention and the method of applying the same to a suitable substrate.

*Example*

To six parts by volume of a solvent solution containing 38% by weight epoxyphenolic resin, available commercially under the trade name "Midland V-665 Epoxy Phenolic Resin" is added slowly, with constant stirring, one part by volume of an aqueous dispersion containing 48% by weight finely divided polytetrafluoroethylene particles having an average size of about .200 micron, available commercially under the trade name "Teflon Resin One-Coat Enamel 851–204." The mixture is stirred until the polytetrafluoroethylene particles are uniformly dispersed throughout the resulting mixture.

To the resulting dispersion is added three parts by volume of ethyl acetate. The resulting mixture is stirred until it is uniform.

The above described mixture may then be applied to a desired substrate, e.g., a steel panel, by means of a suitable spray gun in the following manner:

The substrate to be coated is cleaned with a suitable cleansing lacquer to remove grease, oils, fingerprints and dirt. The spraying mixture is then sprayed on the substrate to produce the desired thickness. For example, one may use a spray gun of the vacuum or pressure type, which produces for each spray pass a thickness of .5 to .7 mil (.0005–.0007 inch). If a number of spray passes are to be made to form a film of a relatively high thickness, e.g., 3 mils, with a spray gun of the aforedescribed type, one should allow about 10 minutes drying time between spray passes. After the desired film thickness is effectuated, the coating is air-dried for about 60 minutes, and the coating is then baked for 1 hour at 325° F. +10° F.

The invention in its broader aspects is not limited to the specific steps, methods and compositions described, but departures may be made therefrom within the scope of the accompanying claims without departing from the principles of the invention and without sacrificing its chief advantages.

What is claimed is:

1. A sprayable mixture useful in the production of a low-bake coating having a desirable combination of properties comprising: an epoxyphenolic resin, finely divided polyhalocarbon particles and a dispersing medium, including an essential component, a lower alkyl acetate ester, which serves as a thinner; the ratio of solids of epoxyphenolic resin to polyhalocarbon particles being in the range of 2.0 to 5.0 parts by weight of epoxyphenolic resin per part of polyhalocarbon particles; the total solids content of the sprayable mixture being in the range of 28.4 to 38.2% by weight of the total composition and the lower alkyl acetate ester being in an amount from about 27–40% by weight of the sprayable mixture.

2. A spraying mixture useful in the production of a low-bake coating having a desirable combination of properties comprising: an epoxyphenolic resin, finely divided polytetrafluoroethylene particles and a dispersing medium, including as an essential component, ethyl acetate, which serves as a thinner; the ratio of solids of epoxyphenolic resin to polytetrafluoroethylene particles being in the range of 2.0 to 5.0 parts by weight of epoxyphenolic resin per part of polytetrafluoroethylene particles, the total solids content of the sprayable mixture being in the range of 28.4 to 38.2% by weight of the total composition and the ethyl acetate being in an amount from about 27–40% by weight of the sprayable mixture.

3. A sprayable mixture useful in the production of a low-bake coating having a desirable combination of properties comprising a mixture of: (1) a solvent solution of an epoxyphenolic resin; (2) an aqueous dispersion of finely divided polytetrafluoroethylene particles; and (3) ethyl acetate thinner; the ratio of solids of epoxyphenolic resin to polytetrafluoroethylene particles being in the range of 2.0 to 5.0 parts by weight of epoxyphenolic resin per part of polytetrafluoroethylene particles, the total solids content of the sprayable mixture being in the range of 28.4 to 38.2% by weight of the total composition and the ethyl acetate being in an amount from about 27–40% by weight of the sprayable mixture.

4. A sprayable mixture according to claim 3 wherein the solvent solution has a solids content of 38% by weight and is in an amount of 6 to 7 parts by volume, the aqueous dispersion of polytetrafluoroethylene particles has a solids content of 48% by weight and is in an amount of 0.5 to 1.0 parts by volume, and ethyl acetate is in an amount of 2 to 3 parts by volume.

5. A sprayable mixture useful in the production of a low-bake coating having a desirable combination of properties comprising: (1) six parts by volume of a solvent solution containing 38% by weight epoxyphenolic resin; one part by volume of an aqueous dispersion containing 48% by weight finely divided polytetrafluoroethylene particles, and three parts by volume of ethyl acetate.

6. The method of forming a sprayable composition useful in the production of a low-bake coating having a desirable combination of properties comprising the steps of: mixing an aqueous dispersion of finely divided polytetrafluoroethylene particles and a solvent solution of an epoxyphenolic resin and stirring the resulting mixture until the polytetrafluoroethylene particles are uniformly dispersed throughout the mixture; and adding ethyl acetate as a thinner to the aforedescribed mixture and stirring the resulting composition until it is uniform; the solvent solution of epoxyphenolic resin and the aqueous dispersion of polytetrafluoroethylene particles having a solids content and being in such amounts that the ratio of solids of epoxyphenolic resin to polytetrafluoroethylene particles are in the range of 2.0 to 5.0 parts by weight of epoxyphenolic resin per part of polytetrafluoroethylene particles, the total solids content of the sprayable mixture being in the range of 28.4 to 38.2% by weight of the total composition and the ethyl acetate being in an amount from about 27–40% by weight of the sprayable mixture.

7. The method of forming a sprayable composition according to claim 6 wherein the solvent solution has a solids content of 38% by weight and is in an amount of 6 to 7 parts by volume, the aqueous dispersion of polytetrafluoroethylene particles has a solids content of 48% by weight and is in an amount of 0.5 to 1.0 parts by volume, and ethyl acetate is in an amount of 2 to 3 parts by volume.

8. The method of forming a sprayable composition useful in the production of a low-bake coating having a desirable combination of properties comprising the steps of: mixing six parts by volume of a solvent solution containing 38% by weight of epoxyphenolic resin and one part of an aqueous dispersion containing 48% by weight of finely divided polytetrafluoroethylene particles and stirring the resulting mixture until the polytetrafluoroethylene particles are uniformly dispersed throughout the mixture; and adding three parts by volume of ethyl acetate to the aforedescribed mixture and stirring the resulting composition until it is uniform.

9. The method of forming a film having a desirable combination of properties comprising: (1) applying to a clean substrate a composition comprising an epoxyphenolic resin, finely divided polyhalocarbon particles and a dispersing medium, including an essential component, a lower alkyl acetate ester, which serves as a thinner; the ratio of solids of epoxyphenolic resin to polyhalocarbon particles being in the range of 2.0 to 5.0 parts by weight of epoxyphenolic resin per part of polyhalocarbon particles; the total solids content of the sprayable mixture being in the range of 28.4 to 32.2% by weight of the total composition and the lower alkyl acetate ester being in an amount from about 27–40% by weight of the sprayable mixture; (2) air-drying the applied composition to form a dry coating; and (3) baking said dry coating at a relatively low temperature.

References Cited by the Examiner

UNITED STATES PATENTS

| | | | |
|---|---|---|---|
| 2,613,193 | 10/1952 | Osdal | 260—29.6 |
| 2,782,174 | 2/1957 | Hetherington et al. | 260—29.6 |
| 2,976,257 | 3/1961 | Dawe et al. | 260—29.6 |

OTHER REFERENCES

Modern Plastics Encyclopedia Issue for 1963, September, 1962, vol. 40, No. 1A 1P 986 A2M5, page 487.

Doolittle: Technology of Solvents and Plasticizers, Wiley & Sons, N.Y. (1954), TP247.5 D6, pages 95 and 105.

MURRAY TILLMAN, *Primary Examiner.*

N. F. OBLON, J. L. WHITE, *Assistant Examiners.*